Sept. 13, 1927.                                         1,642,343
                        F. RAIMONDI
         INDUCTIVE LIMITING DEVICE FOR ALTERNATING CURRENTS
                      Filed Aug. 11, 1925
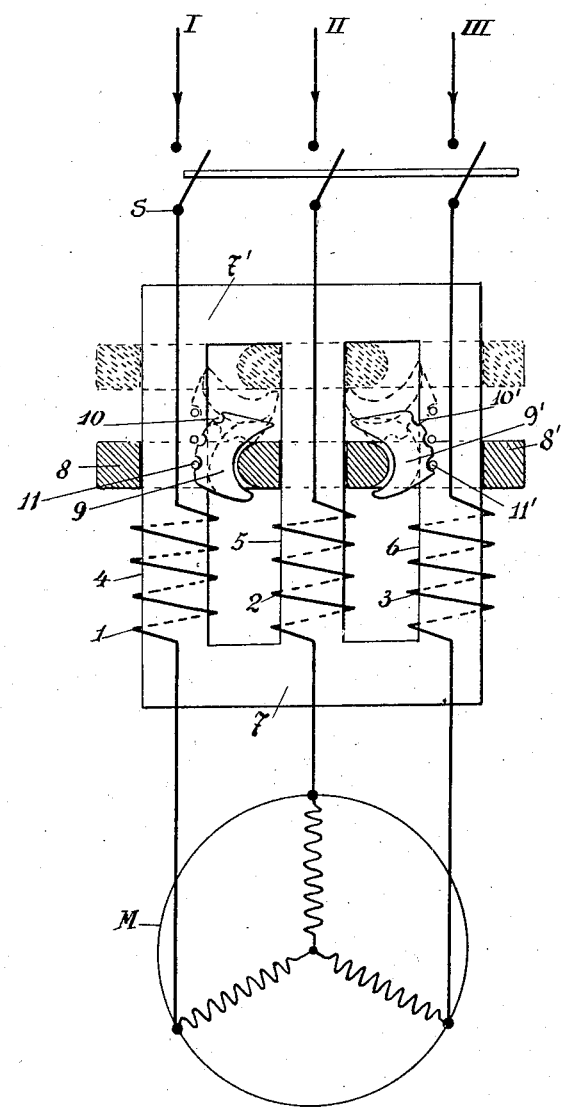
Inventor:
Francesco Raimondi
By
  Attorney Patented Sept. 13, 1927.

1,642,343

UNITED STATES PATENT OFFICE.

FRANCESCO RAIMONDI, OF MILAN, ITALY.

INDUCTIVE LIMITING DEVICE FOR ALTERNATING CURRENTS.

Application filed August 11, 1925, Serial No. 49,674, and in Germany August 26, 1924.

The apparatus, subject of the present invention, acts in an inductive manner in the consumption circuit. It is characterized by at least one exciter winding, which encloses a magnetic core, on which there is arranged a corresponding number of armature windings either in circuit with a negligible resistance, or connected in series or parallel with the corresponding exciter winding and oppositely wound. The said armature windings form a movable complex capable of being connected up with the magnetic members. These magnetic members are so formed and arranged that when they become active by current increase they form abaft the movable armatures an outlet or shunt for the flux traversing the core, as soon as the entire system begins to be influenced under the action of the attraction of the core on the magnetic organs, which assist the electromagnetic repulsion which develops between the exciter and armature windings. This magnetic outlet or shunt, then, is for the purpose of annulling the compensating action which is exercised by the armature windings on the self-induction resistance inherent in the exciter windings.

Comprehensively this apparatus can be used in all cases whereby their peculiar feature, electric current is automatically prevented from exceeding a previously determined limit in that, by their automatic action, they reduce the current to a value previously arbitrarily determined and in that they automatically return to their normal position as soon as the cause which produced an extraordinary increase of the current has ceased to exist.

The apparatus coming within the scope of the present invention can be made in very different constructive forms, according to the nature of the chosen core, according to the number of windings chosen, and according to the nature of the currents to be limited, which may be single phase or multiphase.

In the accompanying drawing there is shown in an example of a constructional form, a diagram relating to an apparatus for three-phase currents which is to replace the ordinary motor starters of this kind.

The apparatus is connected up between the three-phase motor M and the circuit breaker S by means of which the device can be connected up to the three feeders I, II and III. The apparatus itself is composed of the three windings 1, 2 and 3 which are connected in series with the motor and enclose the three arms 4, 5 and 6, of a magnetic core, which is connected by the two transverse parts 7 and 7'. The armature windings of a small electric resistance, which are closed in short circuit, are here represented by the triple ring 8 and 8'. The latter can be considered as consisting of three rings rigidly connected with one another, each one of which encloses one of the arms of the core. The parts, which serve for the magnetic conduction through which the magnetic flux flows from one of the arms 4, 5 or 6, to the other, without transversing the crosspiece 7', are formed by two parts 9 and 9' of magnetizable metal in the shape of tiles. The interior surface of these parts is so formed that it fits into the form of the interior opening of the rings, into which the parts are inserted, while their back is so formed that the pieces can roll off on the side surfaces of the core arms, against which the pieces bear. Each piece has two lateral lugs or plates which embrace the arms of the core and each one of which has a series of indentations 10 and 10', which can successively engage with the pins 11 and 11'. These pins are arranged as a ladder on the sides of the arms of the core. The indentations 10 and 10' cooperate with the parts 9 and 9' in their movement which they effect under the control of the ring 8 and 8'.

In this arrangement, as soon as the electromagnetic repulsion of the windings 1, 2 and 3 on the triple ring 8 and 8' has reached a sufficient value to compensate its weight and as soon as the magnetic attraction of the arm 5 on the parts 9 and 9' has become sufficiently strong (which is the case as soon as the current strength absorbed by the motor has reached the prefixed limit value), the triple ring is pushed into its upper position, which is indicated by dotted lines, that is it is pushed upwardly by the parts 9 and 9' which take on the position in which they can effect the magnetic shunt between the arms of the core, which practically stops every compensating action of the ring on the self induction resistance of the windings 1, 2 and 3.

Let us assume that motor M is to be started. For this it suffices to close the circuit breaker S. The current, accordingly, has the tendency to enter with an extraordinarily high intensity, since the motor develops no counter-electro-magnetic force, as it is standing still. Under the action of this current shock the apparatus is automatically placed into action. The entire self-induction resistance of the windings 1, 2 and 3 becomes effective, and consequently the intensity of the supply current is reduced to the desired value, that is, the value which suffices for the starting. As soon as the motor has reached a speed sufficient to lower the current intensity, which normally corresponds to the motor, the apparatus will take again its position of rest, in which the impedance of the windings 1, 2 and 3 can be neglected on account of the compensating action of the ring 8 and 8'.

The position of the triple ring 8 and 8' and the parts 9 and 9' corresponding to the starting of the motor to which the apparatus is applied is that shown on the drawing in dotted lines. The position of the elements corresponding to the running of the motor is that shown in full lines.

More specifically when the apparatus is traversed by the normal excitation current the ring 8—8' is not yet balanced by the repulsive electrodynamic action of the current flowing through the windings 1—2—3; the induced current flowing through this ring, which reduces the impedance set up by the windings, also limits the magnetizing of the core, and the parts 9—9' remain in equilibrium because they cannot yet overcome the dead weight of the ring on account of their great distance from the middle arm which attracts them and of the feebleness of the active magnetism. When the apparatus is traversed by the predetermined maximum current, the ring 8—8' tends to rise under the push of the aforesaid electrodynamic action and the magnetism of the core is reinforced by the increase of the circulating current; the parts 9—9' can then enter into action because they no longer have to overcome any weight and they yield to a magnetic attraction which has become sufficient.

As soon as the apparatus is started, the magnetic attraction of the middle arm on the parts 9—9' starts to increase rapidly on account of the progressive approach of the parts 9—9' to the middle arm and of the increase of magnetization consequent upon the separation of the ring; these pieces then move the said ring 8—8' sharply upward, whereas they roll against the flanks of the external arms in the direction necessary to permit their approach toward the middle arm. The structural embodiment represented tends to facilitate and regulate this rolling movement, since the parts 9—9' are shaped like crescents and engage the flanks of the arms and the internal flanks of the multiple ring 8—8'.

The apparatus thus acts as an automatic starter. Nevertheless, it can play the part of a safety device, since as soon as, for any reason, the current becomes extraordinarily strong, it acts again and reduces the current to a permissible value. Even when the supply current stops and then suddenly appears again, or when the motor has not been cut out of the circuit by means of the circuit breaker S, the apparatus will prevent any damage in that it automatically acts as a starter.

It is apparent that this apparatus can be used for single-phase currents. For this it suffices to disconnect the two windings 1 and 3 and the respective armatures and to retain winding 2 and its armature. In this case, winding 2 would be connected to a single-phase.

Any other kind of core may also be used. The necessary modifications for the windings and for the parts effecting the magnetic short circuit may be chosen to fit the conditions and that in such manner as preferred by any experienced technician without deviating from the basic idea of the present invention.

What I claim is:

1. An inductive electro-magnetic limiting device comprising a magnetic core having three arms; a metal cross-piece for each of the ends of the arms; an exciter winding for each arm of said core; a triple ring surrounding the arms of the core forming a reaction winding; a plurality of pins on the two outer arms of the core; and a pair of metal parts guided and cooperating with the pins on the outer arms of the core for effecting a magnetic shunt for the core.

2. An inductive electro-magnetic limiting device comprising a magnetic core; an exciter winding for said core; adjusting means for effecting a magnetic shunt for the core; and means forming a reaction winding and adapted to be adjusted by said adjusting means.

3. An inductive electro-magnetic limiting device comprising a magnetic core; an exciter winding for said core; adjusting means for effecting a magnetic shunt for the core; and a movable ring surrounding said core forming a reaction winding and adapted to be adjusted by said means.

4. An inductive electro-magnetic limiting device comprising a magnetic core; an exciter winding for said core; adjusting means for effecting a magnetic shunt for the core; and a ring surrounding said core comprising a plurality of windings forming a reaction winding and adapted to be adjusted by said means.

5. An inductive electro-magnetic limiting device comprising a magnetic core; an exciter winding for said core; a pair of metal parts on the core for effecting a magnetic shunt for the core; and a ring surrounding said core forming a reaction winding and adapted to be adjusted by said pair of metal parts.

6. An inductive electro-magnetic limiting device comprising a magnetic core having three arms; an exciter winding for each arm of said core; adjusting means for effecting a magnetic shunt for the core; and a triple ring surrounding the arms of the core forming a reaction winding and adapted to be adjusted by said means.

7. An inductive electro-magnetic limiting device comprising a magnetic core having three arms; an exciter winding for each arm of said core; a pair of metal parts on the core for effecting a magnetic shunt for the core; and a triple ring surrounding the arms of the core forming a reaction winding and adapted to be adjusted by said means.

8. An inductive electro-magnetic limiting device comprising a magnetic core having three arms; a metal crosspiece for each of the ends of the arms; an exciter winding for each arm of said core; adjusting means for effecting a magnetic shunt for the core; and a triple ring surrounding the arms of the core forming a reaction winding and adapted to be adjusted by said means.

In testimony whereof I affix my signature.

FRANCESCO RAIMONDI.